(12) United States Patent
Reichmann et al.

(10) Patent No.: US 6,649,866 B2
(45) Date of Patent: Nov. 18, 2003

(54) TOOL HEAD FOR LASER MACHINING OF MATERIALS

(75) Inventors: Lutz Reichmann, Jena (DE); Bjoern Hauer, Jena (DE); Juergen Wolf, Schloeben (DE); Wolf-Juergen Denner, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 0 days.

(21) Appl. No.: 10/140,448

(22) Filed: May 6, 2002

(65) Prior Publication Data

US 2002/0179582 A1 Dec. 5, 2002

(30) Foreign Application Priority Data

May 7, 2001 (DE) .......................... 101 23 097

(51) Int. Cl.[7] .................... B23K 26/00; B23K 26/14; B23K 26/16
(52) U.S. Cl. .................................. 219/121.84
(58) Field of Search ............ 219/121.84, 121.85, 219/121.83, 121.67, 121.68, 121.69

(56) References Cited

U.S. PATENT DOCUMENTS

| | | | |
|---|---|---|---|
| 4,467,171 A | * | 8/1984 | Ramos ................. 219/121 LG |
| 4,724,299 A | * | 2/1988 | Hammeke .............. 219/121 L |
| 6,019,599 A | | 2/2000 | Völcker et al. |
| 6,316,743 B1 | * | 11/2001 | Nagahori et al. ...... 219/121.67 |

FOREIGN PATENT DOCUMENTS

| | | |
|---|---|---|
| DE | 38 16 773 | 12/1988 |
| DE | 39 23 829 A | 1/1991 |
| DE | 39 23 829 | 4/1993 |
| DE | 295 04 457.8 | 6/1995 |
| DE | 197 34 294 | 2/1999 |
| DE | 198 51 661 | 1/2001 |
| EP | 0 732 169 A | 9/1996 |
| GB | 2 163 692 A | 5/1986 |

OTHER PUBLICATIONS

English Abstract of JP 02 099293 (Apr. 11, 1990).
English Abstract of JP 61 229491 (Oct. 13, 1986).
English Abstract of JP 09 192870 (Jul. 29, 1997).
English Abstract of EP 0 732 169 A.
English Abstract of DE 39 23 829 A.

* cited by examiner

Primary Examiner—M. Alexandra Elve
(74) Attorney, Agent, or Firm—Reed Smith LLP

(57) ABSTRACT

The invention is directed to a tool head for machining of materials by laser, substantially comprising focusing optics which are arranged in a housing and through which a laser beam bundle is directed to the workpiece surface to be machined, a nozzle which coaxially surrounds the optical axis of the laser beam bundle and conducts gas in the beam direction in order to prevent contamination of the focusing optics by particles released on the workpiece surface to be machined, a pipe which coaxially surrounds the nozzle and which likewise conducts gas for preventing contamination of the nozzle, and a suction device with suction nozzles.

6 Claims, 3 Drawing Sheets

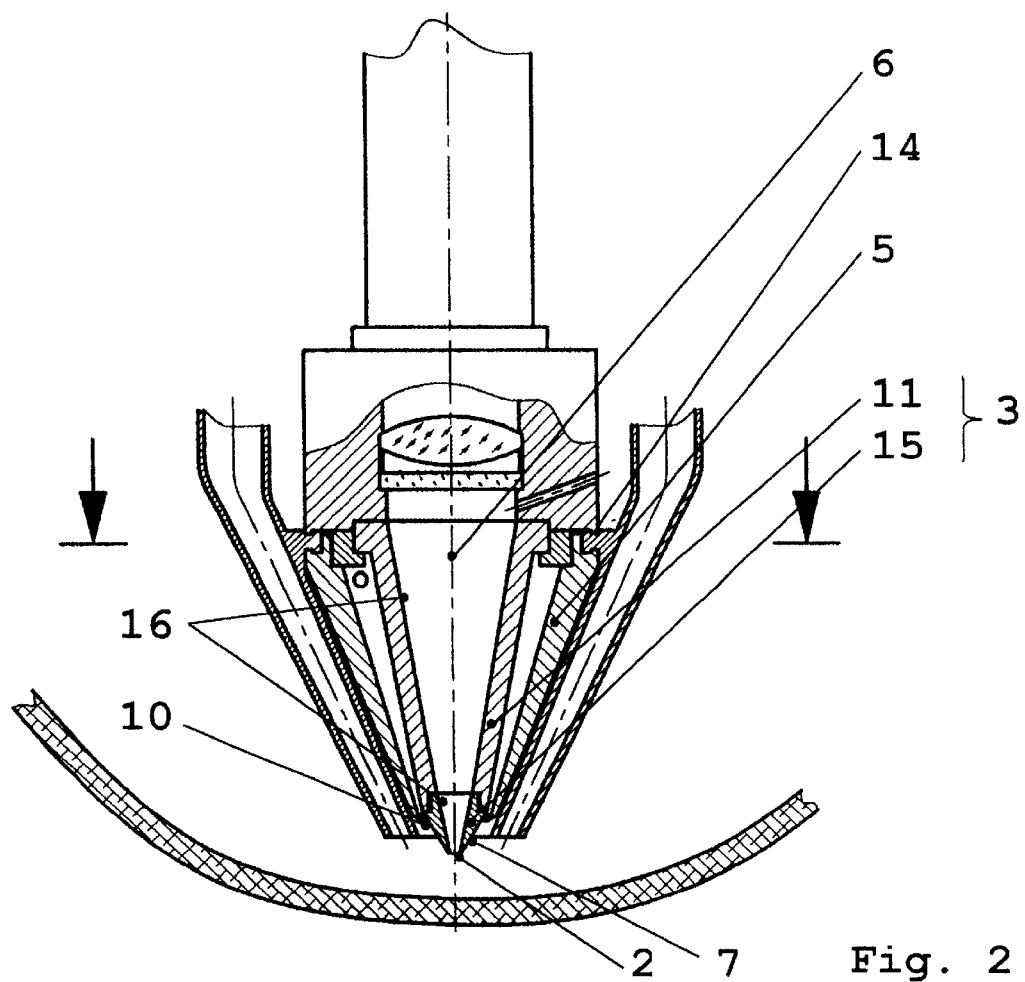
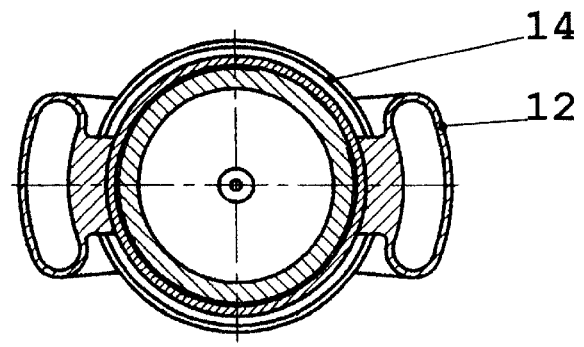
Fig. 2
Fig. 3

TOOL HEAD FOR LASER MACHINING OF MATERIALS

CROSS-REFERENCE TO RELATED APPLICATIONS

This application claims priority of German Application No. 101 23 097.4, filed May 7, 2001, the complete disclosure of which is hereby incorporated by reference.

BACKGROUND OF THE INVENTION a) Field of the Invention

The invention is directed to a tool head such as can be used for all material-removing or cutting processes by means of laser and as is known generically from DE 295 04 457 U1.

b) Description of the Related Art

In material-removing or cutting processes by means of laser, reaction materials (particles) are released in the cutting zone which move away from the surface of the workpiece randomly in an explosive manner. When these reaction materials come to rest and are deposited in the area of the beam path of the laser beam bundle (optical channel), they can hinder the laser machining process uncontrollably.

Such hindrances can be brought about on the one hand by a change in the transmission conditions in the optical channel and, on the other hand, by a geometric limiting of the optical channel.

In practice, impairment of transmission conditions is brought about when optically active surfaces are contaminated or the air paths in the optical channel fill with particles causing increased absorption and scattering of the laser radiation.

The risk of geometric limitation of the optical channel exists particularly when edges and surfaces which are not actually optically active undergo a geometric expansion in the optical channel due to depositing of particles and thereby become optically active.

As a result of the problems described above, the following mandatory requirements are made for a tool head with a laser cutting nozzle:

particles must be prevented from falling on the final optical surface in the direction of the workpiece surface;

the air path must be kept free from particles in the optical channel between the final optical surface and the surface of the workpiece, i.e., these particles must be removed immediately as they occur.

Different solutions are known from the prior art for overcoming these problems which meet the requirements with varying degrees of expenditure and success.

In order to prevent contamination of the focusing optics required for beam shaping, it is known to arrange a protective glass after the focusing optics in the beam direction. The protective glass is exchanged when its contamination impairs machining. This means a cyclically repeating expenditure of time and materials. In order to keep the protective glass clean for longer periods, it is known to blow away particles released during machining by a lateral gas flow and then to suck out the particles (cross-jet principle). In this way, particles located downstream of the axis of the laser beam bundle can be reliably removed, while particles located upstream are deflected and can be blown from the protective glass. Contamination is accordingly slowed down but not reliably prevented.

In order for a gas flow directed transverse to the laser beam bundle to be applied to the machining surface and then sucked out again, the arrangement requires at least one gas nozzle and a suction device transverse to the laser beam bundle.

Due to its expanded construction transverse to the laser beam bundle, a solution of this kind has a increased space requirement directly above the workpiece surface to be machined and is therefore limited to the machining of flat workpieces.

The solution disclosed in Utility Model DE 295 04 457 U1 promises a reduced space requirement and improved prevention of contamination of the protective glass following the focusing optics. The basic idea in this case is to constantly move the released particles out of the optical channel away from the axis of the laser beam bundle and to prevent reaction materials from the environment from entering the optical channel. For this purpose, a nozzle is arranged following the protective glass. The gas flow supplied via an inlet opening is guided through the coaxial arrangement of the nozzle about the axis of the laser beam bundle in its radiating direction and completely encloses the laser beam bundle and, therefore, the optical channel between the outlet opening of the nozzle and the surface of the workpiece. In order to suck out the gas flow, including the entrained particles, the nozzle is surrounded by an annular exhaust funnel. In an arrangement of this kind, the gas flows essentially in axial direction of the laser beam bundle until impacting on the workpiece surface and is then deflected in radial direction away from the axis.

While the solution described above does prevent contamination of the protective glass and ensures rapid removal of particles from the optical channel, it creates a new problem in some cases. The circumstances under which it only becomes a problem are when the selected diameter of the outlet opening of the nozzle should be as small as possible.

Assuming that the diameter of the outlet opening of the nozzle should be as small as possible in order to generate a high kinetic energy which acts against the particle flight due to a high flow velocity even with small amounts of gas, the diameter of the outlet opening should only have minimally greater dimensions than the diameter of the optical channel in this plane. However, this means that even small deposits at the outlet opening can lead to an uncontrolled limiting of the beam bundle and, therefore, to an uncontrolled influence on the laser radiation output impinging on the surface of the workpiece.

As has been shown in practice, the particles accumulate very quickly in radial as well as axial direction to the axis of symmetry of the nozzle at its outlet opening. The outlet opening which is round when in clean condition "grows" in a funnel-shaped manner in the beam direction as the deposit of particles increases, so that an undefined diaphragm stop effect can be produced on the laser beam bundle.

The same problems can occur in a solution described in DE 39 23 829. In this case, the optics are again followed by a nozzle which surrounds the laser beam bundle coaxially, but which serves to supply a reaction gas. The nozzle is surrounded by an exhaust hood which has a plurality of inlet openings arranged in a ring-shaped manner in the vicinity of the workpiece surface and outlet openings near the nozzle. This construction causes flow ratios under the exhaust hood such that reaction materials are prevented from exiting, which serves essentially to protect work personnel.

DE 197 34 294 describes an exhaust installation for a device for laser machining, particularly for laser welding. In this case, an inner and outer annular nozzle is arranged coaxial to the focusing optics. The inert or protective gas required for welding is supplied through the inner annular nozzle, while the reaction materials and protective gas are sucked out through the outer annular nozzle. No steps are taken to prevent reaction materials from depositing in the optical channel which is enclosed in this case by the inner surface of the inner annular nozzle.

When the prior art described above is considered as a whole, the arrangement of a gas-conducting nozzle surrounding the laser beam bundle (optical channel) shows itself to be very suitable for preventing particles from depositing on the final surface of the focusing optics. However, in order for the nozzle to be dimensioned in an optimal manner for generating a high gas velocity, i.e., with the smallest possible outlet opening, steps must be taken to prevent particles from depositing at its outlet opening in particular.

One possibility consists in keeping the particle flow away from the outlet opening. Since the path of the particle flow is essentially determined by the flow direction of the suction, apart from the impact directions when the particles are detached, contamination of the outlet opening can be extensively prevented when the suction is oriented just above the machining surface radial to the radiating direction of the laser beam bundle as was described in the beginning. An arrangement of this type is not suitable for machining three-dimensional surfaces. Rather, the only arrangements considered are those in which the suction devices are arranged in axial direction around the optical channel so that the freedom of movement of the tool head with respect to three-dimensional surfaces is not limited by the suction device. Therefore, the particle flow also strikes the outlet opening and the adjacent surfaces of the nozzle. The prior art shows no solution in which steps are undertaken for preventing particles from accumulating on the outlet nozzle and the adjacent surface of the nozzle.

OBJECT AND SUMMARY OF THE INVENTION

It is the primary object of the invention to provide a tool head for laser machining of materials comprising a nozzle which conducts gas and which surrounds the laser beam bundle and comprising a suction device, wherein particles are reliably prevented from depositing on the outlet opening and on the adjacent surface of the nozzle. Further, a design solution is to be found for the tool head that is also suitable for machining workpieces having a three-dimensional surface form.

The object of the invention is met by a tool head for machining of materials by laser comprising a gas-conducting nozzle surrounding the laser beam bundle and a suction device in that the nozzle is coaxially enclosed by a pipe whose inner diameter is greater than the outer diameter of the nozzle in every plane radial to the axis and the first end of the pipe is connected in a gastight manner to the outer shell or surface of the nozzle, in that an inlet opening is provided in the pipe, through which a gas is introduced into the intermediate space formed between the outer surface of the nozzle and the inner surface of the pipe, in that the second end of the pipe is limited to an annular outlet opening by the outer surface of the nozzle, and in that the annular outlet opening is arranged after the outlet opening in the radiating direction of the laser beam bundle, so that the gas flows in axial direction around the exposed outer surface of the nozzle until the outlet opening and subsequently flows to the workpiece surface so as to enclose the free jet exiting from the nozzle.

The invention will be described more fully in the following in two embodiment examples with reference to the drawings.

BRIEF DESCRIPTION OF THE DRAWINGS

In the drawings:

FIG. 2 shows a side view in section through a second tool head;

FIG. 3 shows a top view of the second tool head;

DESCRIPTION OF THE PREFERRED EMBODIMENTS

Figure 1:
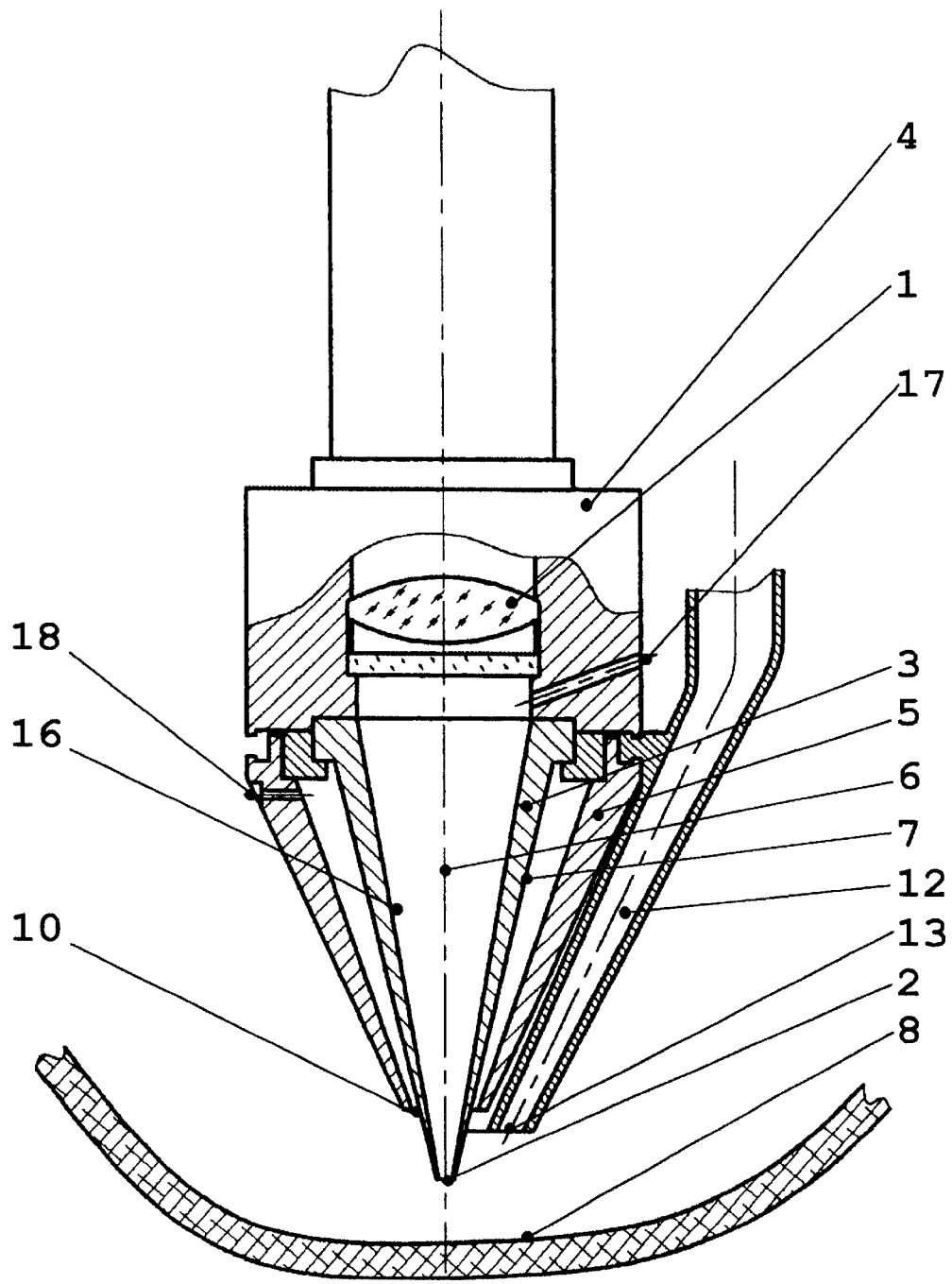
FIG. 1 shows a side view in section through a first tool head.

Like the generic tool heads of the prior art, the tool head described in a first embodiment example shown in FIG. 1 substantially comprises focusing optics 1 which are mounted in a housing 4 and by which a laser beam bundle is focused on the workpiece surface 8 to be machined. In order to prevent contamination of the focusing optics 1 by particles released during the laser machining, the focusing optics 1 are followed in the radiating direction of the laser beam bundle by a nozzle 3 in such a way that the axis of symmetry of the nozzle 3 coincides with the optical axis 6 of the focusing optics 1. As is known from the prior art, the nozzle 3 is a conical pipe which is open on both sides and whose first end is connected to the focusing optics 1 in a gastight manner and whose diameter in every radial plane is greater than the cross section of the laser beam bundle (optical channel) so that the nozzle 3 does not produce a diaphragm stop effect. At least one gas feed opening 17, through which a quantity of gas is pressed into the nozzle 3 during the machining process, is located in the shell or surface of the nozzle 3 near the first end. The nozzle shape and the described arrangement of the nozzle 3 relative to the laser beam bundle cause a gas flow in the radiating direction (free jet) until impact on the workpiece surface 8. In order to achieve the highest possible flow velocity with the smallest possible amount of gas at the outlet opening 2 of the nozzle 3 formed by the second end of the pipe forming the nozzle 3, the outlet opening 2 should have the smallest possible diameter. This is the first difference between the invention and the generic tool head described in the prior art. Since none of the known solutions, as already presented in the description, undertake steps which prevent the depositing of particles (sedimentation) on the outlet opening 2, it must be assumed that the outlet opening 2 of the nozzle 3 in these solutions is deliberately appreciably larger than the optical channel so that deposits producing a reduction or dislocation of the outlet opening 2 do not act so as to limit the bundle.

In order to prevent such deposits, the tool head according to the invention has a pipe 5 which is arranged coaxially around the nozzle 3 and which acts as a ring nozzle in cooperation with the outer shell or surface 7 of the nozzle. The first end of the pipe 5 is connected in a gastight manner to the outer surface 7 of the nozzle. A gas introduced via an inlet opening 18 located in the pipe jacket is accordingly guided to the second end of the pipe 5. This pipe 5 is reduced to an annular outlet opening 10 by the nozzle 3 arranged in the interior. It is essential to the invention that the annular outlet opening 10 is set back in the beam direction relative to the outlet opening 2. The gas exiting from the annular outlet opening 10 accordingly flows along the exposed outer surface 7 of the nozzle until the outlet opening 2 so as to prevent particles from depositing.

In this first embodiment example, the nozzle 3 is formed of one piece. In technical respects with regard to manufacturing, the shells or outer surfaces of the nozzle 3 and the pipe 5 can be manufactured most simply when they have the same cone angle or angle of taper along their entire length. The angle of taper of the inner shell or surface 16 of the nozzle, the outer surface 7 of the nozzle and the inner surface 9 of the pipe may differ.

The construction of the suction device, of which only the suction nozzle 12 is shown, will be described further below.

In a second embodiment example shown in FIGS. 2 and 3, the nozzle 3 is constructed in two parts comprising the nozzle base body 11 and the nozzle tip 15. The two-part construction of the nozzle 3 makes it possible to exchange the nozzle tip 15, e.g., after damage occurs. Further, this construction offers a simple, problem-free possibility for manufacturing the outer surface 7 of the nozzle in the area around the outlet opening 2 with an angle of taper that is greater toward the axis 6, so that the annular gas flow exiting from the pipe 5 impacts already just below the outlet opening 2 on the gas flow exiting from the nozzle. The nozzle tip 15 is accordingly also reliably protected in the immediate edge area toward the outlet opening 2. The suction device which is likewise associated with the tool head will be described in more detail in the following.

Like the inner surface 16 of the nozzle, the outer surface 7 of the nozzle need not necessarily be conical in the area of the outlet opening 2, which is the usual surface shape for a nozzle. It is essential for the invention only that the gas flow in the nozzle 3 flows around the inner surface 16 of the nozzle and the gas flow exiting from the pipe 5 flows around the outer surface 7 of the nozzle. Both gas flows have essentially the same flow direction, so that the additional gas flow according to the invention acts against the particle flight while reinforcing the gas flow exiting from the nozzle 3.

Figure 4:
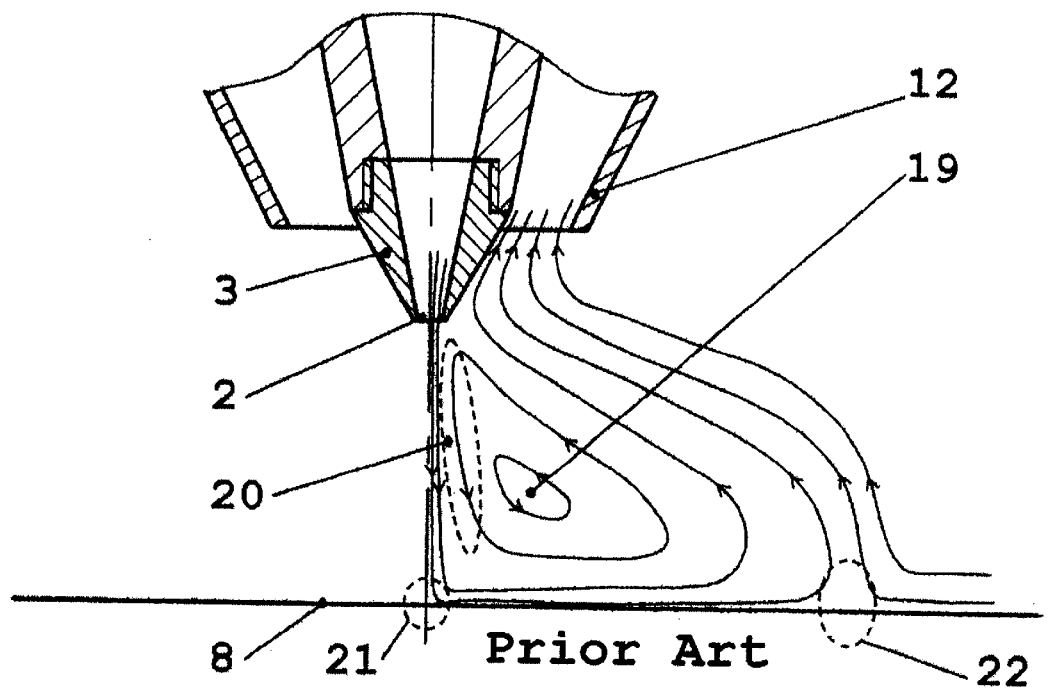
FIG. 4 is a schematic view of the flow schematic view of the gas flow during the machining of materials by laser with a tool head according to the prior art.

FIG. 4 shows the flow schematic view of the gas flow of a tool head according to the prior art. The drawing shows the streamlines in a section plane through the axis 6 of a tool head. A gas flow exits the nozzle 3 at high velocity. It flows as a free jet in the direction of the machining location on the workpiece (workpiece surface 8). A vacuum area 20 is formed at the edge of the free jet as a result of the high velocity of the free jet. In this way, the gas is sucked in from the outside and mixed in to the jet. The axial free jet impacts on the workpiece at the machining point where it is deflected in radial direction. In terms of fluid mechanics, this point represents the stagnation point 21. The flow contacts the surface of the workpiece until a detaching point 22. The flow velocity decreases from the stagnation point 21 to the detaching point 22. After the detaching point 22, the gas is sucked into the annular suction nozzle 12 together with air flowing radially inward.

As a result of these flow conditions, a whirl or eddy 19 is formed. This eddy 19 need not necessarily be radially symmetric. The detaching point 22 can be shifted, for example, by the contour of the workpiece. However, this is unimportant as regards the following description.

At the stagnation point 21, the gas flow is charged with particles formed during the laser machining. In the flow, the particles experience an average force in the direction of the streamlines. However, this applies only to the time average. Actually, the particles are whirled through the turbulence of the flow. This means that the particles carry out random movements in the flow; the lighter the particles, the greater the random movements. In addition, the particles are emitted from the machining location at a randomly distributed velocity. This explains why the eddy 19 of the gas flow is charged with particles and why particles which absorb or reflect laser radiation are repeatedly mixed into the axial gas jet, so that the use of the laser radiation for machining the workpiece is restricted. Further, particles from the eddy 19 are repeatedly deposited on the nozzle 3. This sedimentation takes effect particularly in the area around the outlet opening 2 because the streamlines have a sharp curvature there. A strong centrifugal force then acts on the particles to propel them in the direction of the nozzle 3. A large portion of the particles impact on the cutting-nozzle head, where a sedimentation zone is formed. Accordingly, it is necessary to clean adhering particles from the nozzle head at frequent intervals.

Figure 5:
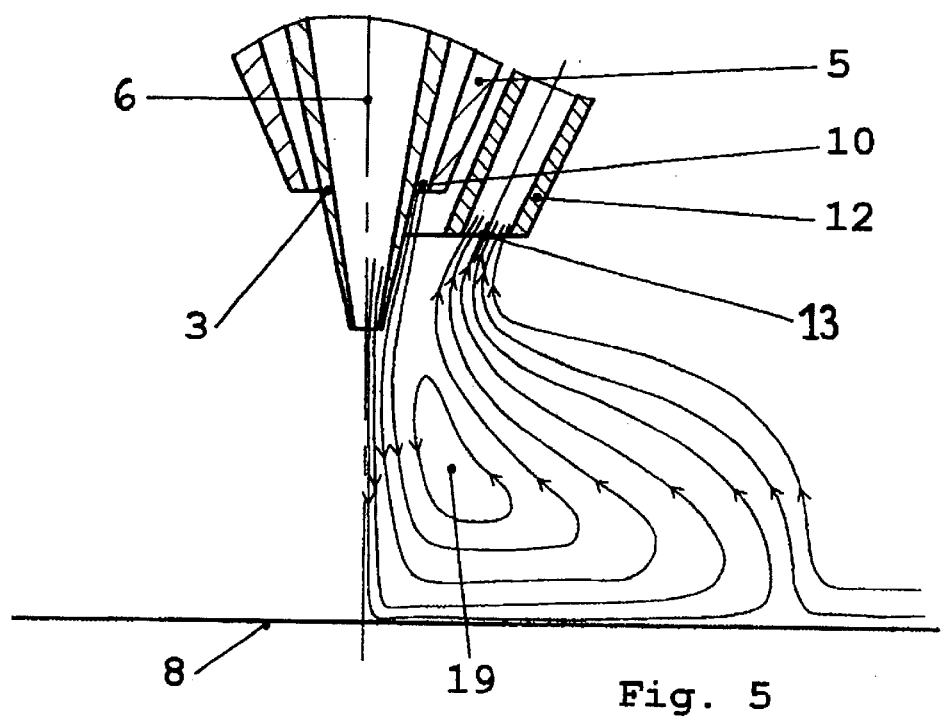
FIG. 5 is a schematic view of the flow schematic view of the gas flow during the machining of materials by laser with a tool head according to the invention.

FIG. 5 shows the flow conditions of the device according to the invention. The drawing shows the streamlines in a section plane through the axis 6 of the tool head. The essential difference with respect to the prior art according to FIG. 4 consists in that the annular outlet opening 10 of a pipe 5 from which fresh gas flows is located between the nozzle 3 and the suction nozzle 12. The flow velocity of the gas from the annular outlet opening 10 is small compared to the flow velocity of the free jet from the nozzle 3. The fresh gas from the outlet opening 10 initially flows along the outer side of the nozzle 3 until its outlet opening 2. It is then sucked in by the free jet of the nozzle 3 and flows together with the latter in axial direction to the workpiece surface 8. In so doing, the fresh gas flow shields the eddy 19 in relation to the nozzle 3 and in relation to the free jet. With regard to the shielding of the nozzle 3, it is important that annular outlet opening 10 is set back relative to the outlet opening 2 of nozzle 2 viewed in the radiating direction.

The eddy 19 is also charged with particles in the device according to the invention, However, in contrast to the prior art (FIG. 4), no contaminated gas from the eddy 19 is mixed into the free jet because the fresh gas is sucked in by the free jet after it flows against the outer side of the nozzle 3 until its outlet opening 2. The transparency of the free jet is accordingly not impaired and, consequently, the energy of the laser beam can be better utilized for machining. Since the gas flow from the annular outlet opening 10 contacts the outer side of the nozzle 3, fresh gas always flows along the nozzle 3, so that the problem of sedimentation is prevented. Very few particles, if any, impact on the nozzle 3, so that hardly any sedimentation occurs.

The illustration of the flow conditions in FIG. 5 indicates the suction nozzles 12 which are associated with the suction device and which will be described more fully in the following.

The suction device can comprise one or more suction nozzles 12 whose inlet opening 13 is arranged behind the outlet opening 2 in the beam direction. Accordingly, the suction device could have only one suction nozzle which, in the form of a double-walled pipe, coaxially encloses the pipe 5 with its annular inlet opening 13. The tool head accordingly undergoes a substantial radial expansion just after the outlet opening 2 of the nozzle 3, which can be a hindrance when machining surface shapes that are curved in a concave manner. In particular when machining workpiece surfaces 8 having freely shaped surfaces with small radii of curvature, the radial expansion of the tool head must be as small as possible so as to have the required free movement space such that the axis 6 of the nozzle 3 can be directed permanently in the direction of the surface normal at the respective machining point on the tool surface. In the second embodiment example, which is described with reference to FIGS. 2 and 3, the suction device has two suction nozzles 12 which are arranged diametric to the axis 6 and whose outlet opening 2 in the form of an annular portion covers only a limited angular area around the pipe 5. Accordingly, the radial expansion of the tool head in vertical direction to the connecting line of the surface centers of the inlet openings 13 remains limited to the diameter of the pipe 5. Depending on the radii of curvature of the workpiece surface 8, the workpiece can be guided to the tool head, or vice versa, in such a way that the relative movement can be carried out without hindrance. The two suction nozzles 12 are fastened to a carrier ring 14 by means of a detachable connection. By loosening this connection, the suction nozzles 12 can be swiveled about the nozzle 3 over an angular area of almost 180°, so that the construction can be adapted to the given workpiece surface 8. Motor-driven adjustment of the suction nozzles 12 during the laser machining of materials is also conceivable.

In the first embodiment example, shown in FIG. 1, only one suction nozzle is arranged at the carrier ring 74. It is positioned in relation to the direction of the relative movement between the tool head and workpiece in such a way, depending on the contour of the three-dimensional surface to be machined, that machining is possible without interference.

While the foregoing description and drawings represent the present invention, it will be obvious to those skilled in the art that various changes may be made therein without departing from the true spirit and scope of the present invention.

| Reference numbers | |
| --- | --- |
| 1 | focusing optics |
| 2 | outlet opening |
| 3 | nozzle |
| 4 | housing |
| 5 | pipe |
| 6 | axis |
| 7 | outer surface of nozzle |
| 8 | workpiece surface |
| 9 | inner surface of pipe |
| 10 | annular outlet opening |
| 11 | nozzle base body |
| 12 | suction nozzle |
| 13 | inlet opening |
| 14 | carrier ring |
| 15 | nozzle tip |
| 16 | inner nozzle surface |
| 17 | gas feed opening |
| 18 | inlet opening |
| 19 | eddy |
| 20 | vacuum area |
| 21 | stagnation point |
| 22 | detaching point |

What is claimed is:

1. A tool head for machining of materials by laser comprising:

focusing optics directing a laser beam bundle generated by a laser to a workpiece surface to be machined;

a gas-conducting nozzle which coaxially surrounds the laser beam bundle with the optical axis and which has an outlet opening that is arranged coaxially around the axis;

wherein a free jet exits from this outlet opening; and a suction device;

said nozzle being coaxially enclosed by a pipe whose inner diameter is greater than the outer diameter of the nozzle in every plane radial to the axis and a first end of the pipe being connected in a gastight manner to the outer surface of the nozzle;

said pipe having an inlet opening, through which a gas is introduced into intermediate space formed between the outer surface of the nozzle and the inner surface of the pipe;

a second end of the pipe being limited to an annular outlet opening by the outer surface of the nozzle; and said annular outlet opening being arranged behind the outlet opening in the radiating direction of the laser beam bundle, so that the gas flows in axial direction around the exposed outer surface of the nozzle until the outlet opening and subsequently flows to the workpiece surface so as to enclose the free jet exiting from the nozzle.

2. The tool head according to claim 1, wherein the suction device has a suction nozzle with an annular inlet opening which is arranged around the pipe coaxial to the axis.

3. The tool head according to claim 1, wherein the suction device has a plurality of suction nozzles whose inlet openings each have the shape of a ring segment and are arranged in a ring-shaped manner around the pipe in the same plane and at the same distance to the axis.

4. The tool head according to claim 3, wherein the suction nozzles are arranged so as to be rotatable about the axis in order to adapt the tool head to the free movement space predetermined by the geometry of the workpiece surface.

5. The tool head according to claim 3, wherein the inlet openings are adjustable with respect to their angular position relative to the axis so that inlet openings can be adjusted in the largest possible angle to the axis while utilizing the free movement space.

6. The tool head according to claim 4, wherein the suction nozzles are fastened to a common carrier ring which is connected with a motor in order to reposition the suction nozzles during the machining process.

* * * * *